US006675087B2

United States Patent
Cullen

(12) United States Patent
(10) Patent No.: US 6,675,087 B2
(45) Date of Patent: Jan. 6, 2004

(54) METHOD AND SYSTEM FOR SCHEDULING OPTIMAL COMPRESSION RATIO OF AN INTERNAL COMBUSTION ENGINE

(75) Inventor: Michael John Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 349 days.

(21) Appl. No.: 09/682,223

(22) Filed: Aug. 8, 2001

(65) Prior Publication Data

US 2003/0069776 A1 Apr. 10, 2003

(51) Int. Cl.[7] .............................. G06F 19/00; B06K 9/06
(52) U.S. Cl. ....................... 701/110; 123/48 B; 705/11; 701/115; 701/102
(58) Field of Search .................................. 701/110, 114, 701/115, 102; 705/9, 11; 123/48 B

(56) References Cited

U.S. PATENT DOCUMENTS

| | | | |
|---|---|---|---|
| 4,287,717 A | * | 9/1981 | Oldfield et al. ................ 60/606 |
| 4,469,055 A | | 9/1984 | Caswell |
| 4,603,546 A | * | 8/1986 | Collins ......................... 60/773 |
| 4,606,191 A | * | 8/1986 | Collins et al. ........... 60/39.281 |
| 4,805,571 A | | 2/1989 | Humphrey |
| 4,834,031 A | | 5/1989 | Katoh et al. |
| 4,860,711 A | | 8/1989 | Morikawa |
| 5,165,368 A | | 11/1992 | Schechter |
| 5,241,855 A | | 9/1993 | Cullen et al. |
| 5,255,637 A | | 10/1993 | Schechter |
| 5,287,827 A | | 2/1994 | Almendinger et al. |
| 5,595,146 A | | 1/1997 | Bollig et al. |
| 5,682,854 A | | 11/1997 | Ozawa |
| 5,791,302 A | | 8/1998 | Ma |
| 5,819,702 A | | 10/1998 | Mendler |
| 5,862,790 A | | 1/1999 | Dai et al. |
| 6,125,801 A | | 10/2000 | Mendler |
| 6,135,086 A | | 10/2000 | Clarke et al. |
| 6,530,862 B2 | * | 3/2003 | Kolmanovsky ............. 477/203 |
| 6,612,288 B2 | * | 9/2003 | Cullen .................... 123/406.23 |

FOREIGN PATENT DOCUMENTS

| | | |
|---|---|---|
| JP | 01092538 A | 4/1989 |
| JP | 01104929 A | 4/1989 |

* cited by examiner

Primary Examiner—Hieu T. Vo
(74) Attorney, Agent, or Firm—Carlos L. Hanze

(57) ABSTRACT

A method of operating a variable compression internal combustion engine in a motor vehicle includes the steps of determining a driveline surge based at least in part on operating parameters of the motor vehicle, determining a driveline surge tolerance based at least in part on one or more of the vehicle operating parameters, and selecting one of the compression ratio operating modes based at least in part on a comparison of the driveline surge to the driveline surge tolerance. With a variable compression engine operating in a high compression ratio mode or a low compression ratio mode, the low compression ratio mode is selected if the driveline surge exceeds the driveline surge tolerance. Otherwise, if the driveline surge is less than or equal to the driveline surge, then the high compression ratio mode is selected.

35 Claims, 4 Drawing Sheets

METHOD AND SYSTEM FOR SCHEDULING OPTIMAL COMPRESSION RATIO OF AN INTERNAL COMBUSTION ENGINE

BACKGROUND OF INVENTION

The present invention relates generally to variable compression internal combustion engines. More particularly, the invention relates to a method and system for operating a variable compression ratio engine that optimizes fuel economy while and minimizing driver perception of undesirable engine surge and torque variations.

The "compression ratio" of an internal combustion engine is defined as the ratio of the cylinder volume when the piston is at bottom-dead-center (BDC) to the cylinder volume when the piston is at top-dead-center (TDC)—generally, the higher the compression ratio, the higher the thermal efficiency and fuel economy of the internal combustion engine. So-called "variable compression ratio" internal combustion engines have been developed, for example, having higher compression ratios during low load conditions and lower compression ratios during high load conditions.

Because of susceptibility to knock in high load conditions, it is often desirable to operate such engines in a low compression ratio mode when the engine is operating in high load conditions. This however limits fuel economy in a frequently used operating range of the engine. As a compromise, the engine can be operated in a high compression ratio mode while simultaneously retarding spark from maximum brake torque (MBT) so as to avoid knock. The retarded spark however increases variability in indicated torque, which in turn results in an increased amount of engine "surge" that may be perceptible to a vehicle operator.

The inventor herein has recognized that since surge can be readily perceived by an operator, especially in relatively steady-state operating conditions, it may be advantageous depending on the amount of surge produced to maintain engine operation at a higher compression ratio with retarded spark during transient operating conditions, e.g., accelerations and decelerations. Accordingly, the inventor herein has disclosed a system and method for modeling engine surge associated with spark retard from MBT. The model can in turn be used to optimally schedule compression ratio mode transitions of a variable compression internal combustion engine.

SUMMARY OF INVENTION

A method of operating a variable compression ratio internal combustion engine in a motor vehicle is disclosed having the steps of determining a driveline surge based at least in part on operating parameters of the motor vehicle, determining a driveline surge tolerance based at least in part on one or more of the vehicle operating parameters, and selecting one of a plurality of compression ratio operating modes of the engine based at least in part on a comparison of the driveline surge to the driveline surge tolerance. In accordance with a preferred method, the driveline surge is proportional to a baseline engine surge, which itself is proportional to brake engine torque.

In accordance with another preferred method of the present invention, a method of operating a motor vehicle having an a variable compression internal combustion engine includes the steps of determining a brake engine torque, determining a baseline engine surge based at least in part on the brake engine torque, determining a driveline surge based at least in part on the baseline engine surge, determining a driveline surge tolerance based at least in part on one or more operating parameters of the motor vehicle, and scheduling operation of the internal combustion engine in one of the compression ratio operating modes based at least in part of a comparison of the driveline surge to the driveline surge tolerance. With an engine operating in two discrete modes, for example at high compression or low compression, the compression ratio operating mode is selected based on the value of the driveline surge. If the driveline surge exceeds the driveline surge tolerance, then the low compression ratio mode is selected. Otherwise, the high compression mode is selected.

A primary advantage of the above-described methods is that a variable compression internal combustion engine and corresponding motor vehicle can be operated in an optimum compression ratio mode so as to maximize fuel economy while minimizing driver perception of engine surge. By predicting a so-called "driveline" surge of the vehicle, operation of the engine in the various compression ratio modes can be scheduled so as to minimize driver perception of engine surge. In low speed/high load operating conditions, for example, an engine operating in a high compression ratio, fuel economy mode can remain in such mode depending on the predicted driveline surge. If for example the predicted surge exceeds a certain driveline surge tolerance, then the compression ratio operating mode can be transitioned from the fuel economy mode to a low compression ratio operating mode. In accordance with the present invention, calibratable table values are used to derive the driveline surge from a derived brake engine torque and baseline engine surge.

In a related aspect of the present invention, a corresponding system is also provided for operating a variable compression internal combustion engine in a motor vehicle. The system includes an apparatus for varying the compression ratio of the internal combustion engine and an electronic controller coupled thereto for determining a driveline surge based at least in part on operating parameters of the motor vehicle, determining a driveline surge tolerance based at least in part on one or more of the vehicle operating parameters, selecting one of the compression ratio operating modes based at least in part on a comparison of the driveline surge to the driveline surge tolerance, and operating the variable compression apparatus to configure the internal combustion engine in one of the compression ratio operating modes.

Further advantages, objects and features of the invention will become apparent from the following detailed description of the invention taken in conjunction with the accompanying figures showing illustrative embodiments of the invention.

BRIEF DESCRIPTION OF DRAWINGS

For a complete understanding of the present invention and the advantages thereof, reference is now made to the following description taken in conjunction with the accompanying drawings in which like reference numerals indicate like features and wherein.

DETAILED DESCRIPTION

Figure 1:
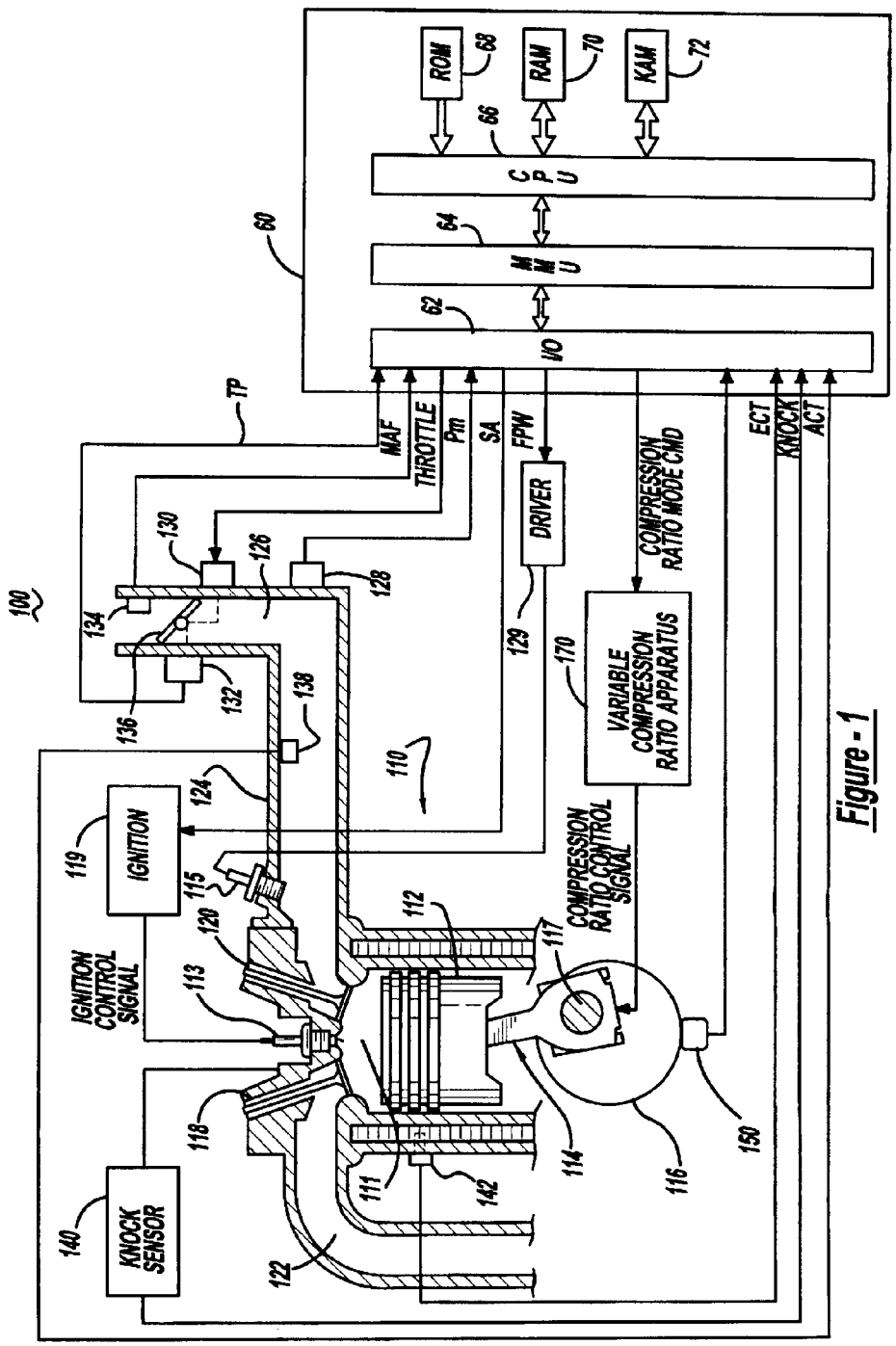
FIG. 1 is a diagram of an exemplary variable compression ratio internal combustion engine in accordance with the present invention.

FIG. 1 shows an exemplary variable compression ratio internal combustion engine in accordance with the present invention. As will be appreciated by those of ordinary skill in the art, the present invention is independent of the particular underlying engine configuration and component designs, and as such can be used with a variety of different internal combustion engines having more than one compression ratio operating modes. The engine for example can be constructed and arranged as a discrete compression ratio engine operating for example at a high compression or at low compression, or as a continuously variable compression ratio engine capable of operating at an infinite number of discrete compression ratios. Similarly, the present invention is not limited to any particular type of apparatus or method required for varying the compression ratio of the internal combustion engine.

Referring again to FIG. 1, the engine 110 includes a plurality of cylinders (only one shown), each having a combustion chamber 111, a reciprocating piston 112, and intake and exhaust valves 120 and 118 for communicating the combustion chamber 111 with intake and exhaust manifolds 124 and 122. The piston 112 is coupled to a connecting rod 114, which itself is coupled to a crankpin 117 of a crankshaft 116. Fuel is provided to the combustion chamber 111 via a fuel injector 115 and is delivered in proportion to a fuel pulse width (FPW) determined by an electronic engine controller 60 (or equivalent microprocessor-based controller) and electronic driver circuit 129. Air charge into the intake manifold 124 is nominally provided via an electronically controlled throttle plate 136 disposed within throttle body 126. Ignition spark is provided to the combustion chamber 111 via spark plug 113 and ignition system 119 in accordance with a spark advance (or retard) signal (SA) from the electronic controller 60.

As shown in FIG. 1, the engine controller 60 nominally includes a microprocessor or central processing unit (CPU) 66 in communication with computer readable storage devices 68, 70 and 72 via memory management unit (MMU) 64. The MMU 64 communicates data (including executable code instructions) to and from the CPU 66 and among the computer readable storage devices, which for example may include read-only memory (ROM) 68, random-access memory (RAM) 70, keep-alive memory (KAM) 72 and other memory devices required for volatile or non-volatile data storage. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical or combination memory devices capable of storing data, including executable code, used by the CPU 66 for controlling the internal combustion engine and/or motor vehicle containing the internal combustion engine. Input/output (I/O) interface 62 is provided for communicating with various sensors, actuators and control circuits, including but not limited to the devices shown in FIG. 1. These devices include an engine speed sensor 150, electronic fuel control driver 129, ignition system 119, manifold absolute pressure sensor (MAP) 128, mass air flow sensor (MAF) 134, throttle position sensor 132, electronic throttle control motor 130, inlet air temperature sensor 138, engine knock sensor 140, and engine coolant temperature 142.

The engine 110 of FIG. 1 also includes and a variable compression ratio apparatus 170. In a non-limiting embodiment, the variable compression ratio apparatus 170 is operated to vary the effective length of the connecting rod 114, and thus the clearance volume and compression ratio of the engine. Such an apparatus is described, for example, in U.S. application Ser. No. 09/682,263 (Attorney Docket No. 200-1546), entitled "Connecting Rod for a Variable Compression Engine," which is owned by the assignee of the present invention and is hereby incorporated by reference in its entirety. The actual construction and configuration of the variable compression apparatus shown in FIG. 1 is not at all intended to limit the scope of claim protection for the inventions described herein.

In a non-limiting aspect of the present invention, the variable compression ratio apparatus of FIG. 1 is described below as operating in a "high" compression ratio mode (compression ratio of 13:1 and above) or a "low" compression ratio mode (compression ratio of 11:1 and below). The actual compression ratio operating mode of the engine can be determined for example by monitoring the pressure inside one or more of the engine's cylinders or by monitoring the configuration of the variable compression ratio apparatus and/or piston height via a position sensor or other suitable means.

Figure 2:
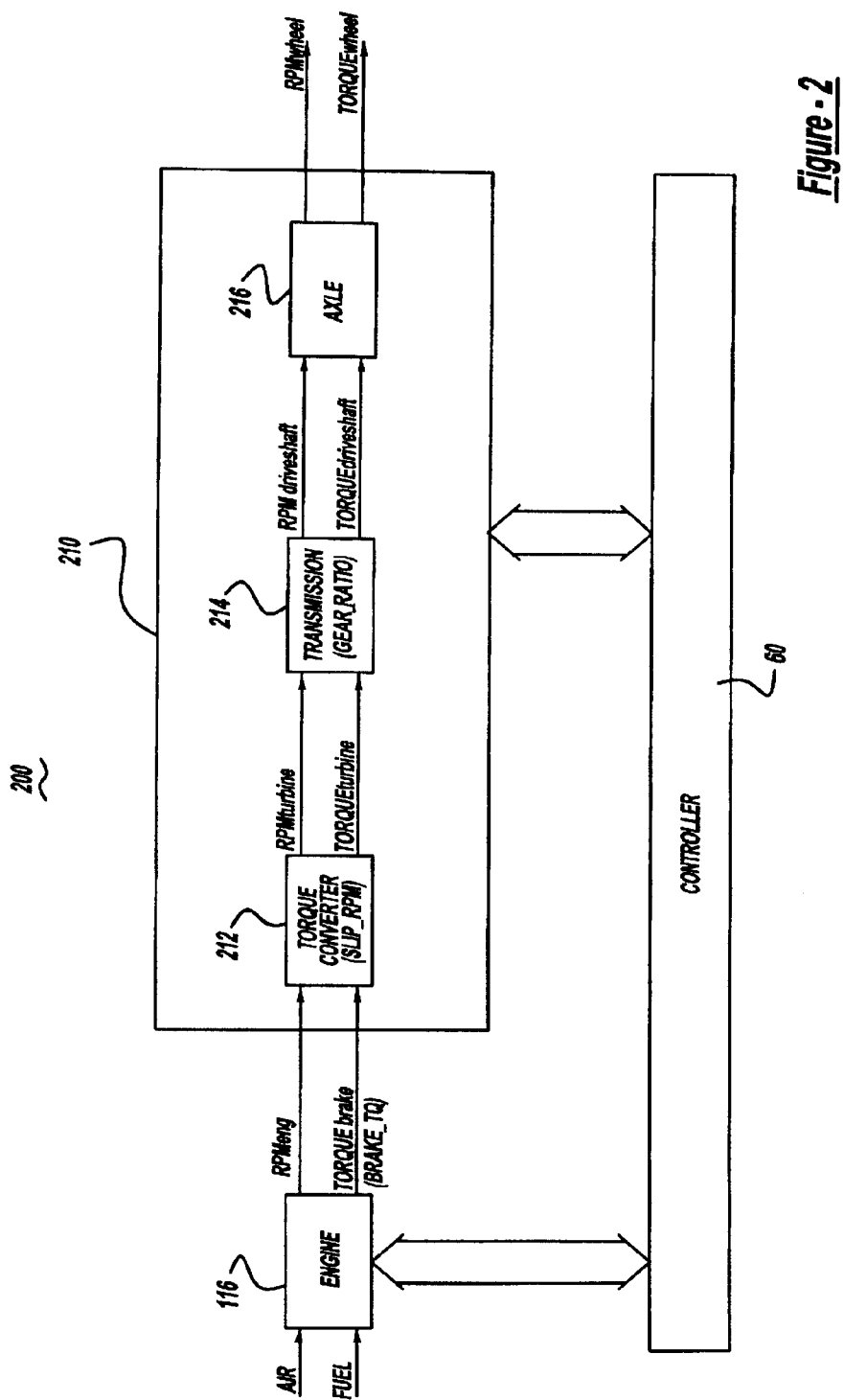
FIG. 2 is a block diagram showing the engine and controller of FIG. 1 coupled to a driveline of a motor vehicle.

FIG. 2 shows a high-level block diagram of the engine 110 and controller 60 of FIG. 1 coupled to a driveline 210 of a motor vehicle. The controller 60 is shown as a powertrain control module for controlling both engine and driveline operations for the motor vehicle. The driveline 210, by way of example and not limitation, includes a torque converter 212, a vehicle transmission 214, and axle 216. The driveline however may include other conventional vehicle driveline components such as the driveshaft, suspension, brakes, etc.

As shown in FIG. 2, the engine 110 generates engine speed and torque outputs $RPM_{eng}$ and $TORQUE_{Brake}$ in response to a commanded air/fuel mixture. $TORQUE_{Brake}$ is commonly referred to as "brake engine torque" and can be derived using estimates of engine indicated torque and engine frictional losses. The torque converter 212 then converts $TORQUE_{Brake}$ to converter output torque $TORQUE_{Turbine}$, and subject to driveline frictional losses, is transmitted through the transmission 214 to generate a driveshaft torque $TORQUE_{Driveshaft}$ and driveshaft rotational speed $RPM_{Driveshaft}$. SLIP_RPM in block 212 represents the difference between engine rotational speed and the rotational speed of a torque converter turbine, and GEAR_RATIO in block 214 the gear ratio of the vehicle transmission. Subject to additional driveline losses, $TORQUE_{Driveshaft}$ is transmitted through the axle 216 to yield wheel torque $TORQUE_{Wheel}$ and corresponding wheel rotational speed $RPM_{Wheel}$. As such, if the engine indicated torque, brake torque and frictional losses of the engine and driveline are known, the vehicle speed and torque outputs $RPM_{Wheel}$ and $TORQUE_{Wheel}$ at the wheels can be estimated.

Advantageously, the variable compression ratio engine 110 described with reference to FIGS. 1 and 2 is operated in a plurality of compression ratio operating modes to improve overall fuel economy while minimizing customer perception of engine surge. "Engine surge", which is transmitted away from the engine as "driveline surge", refers to undesirable torque disturbances resulting from operation of the engine in one or more of the compression ratio operating modes. In accordance with the present invention, an optimal compression ratio mode is selected or scheduled based on a comparison of a driveline surge to a driveline surge tolerance or limit. Preferably, the optimal compression ratio is determined as a function of one or more vehicle operating parameters, including but limited to inlet air temperature (ACT), engine coolant temperature (ECT), program fuel, i.e., octane rating of fuel, engine knock, and determinates of spark retard from MBT, including for example spark retard used to avoid engine knock. The term "vehicle operating parameters" herein refers broadly to any vehicle operating parameters, including engine operating parameters, which are sensed, computed, derived, inferred or otherwise provided.

Figure 3:
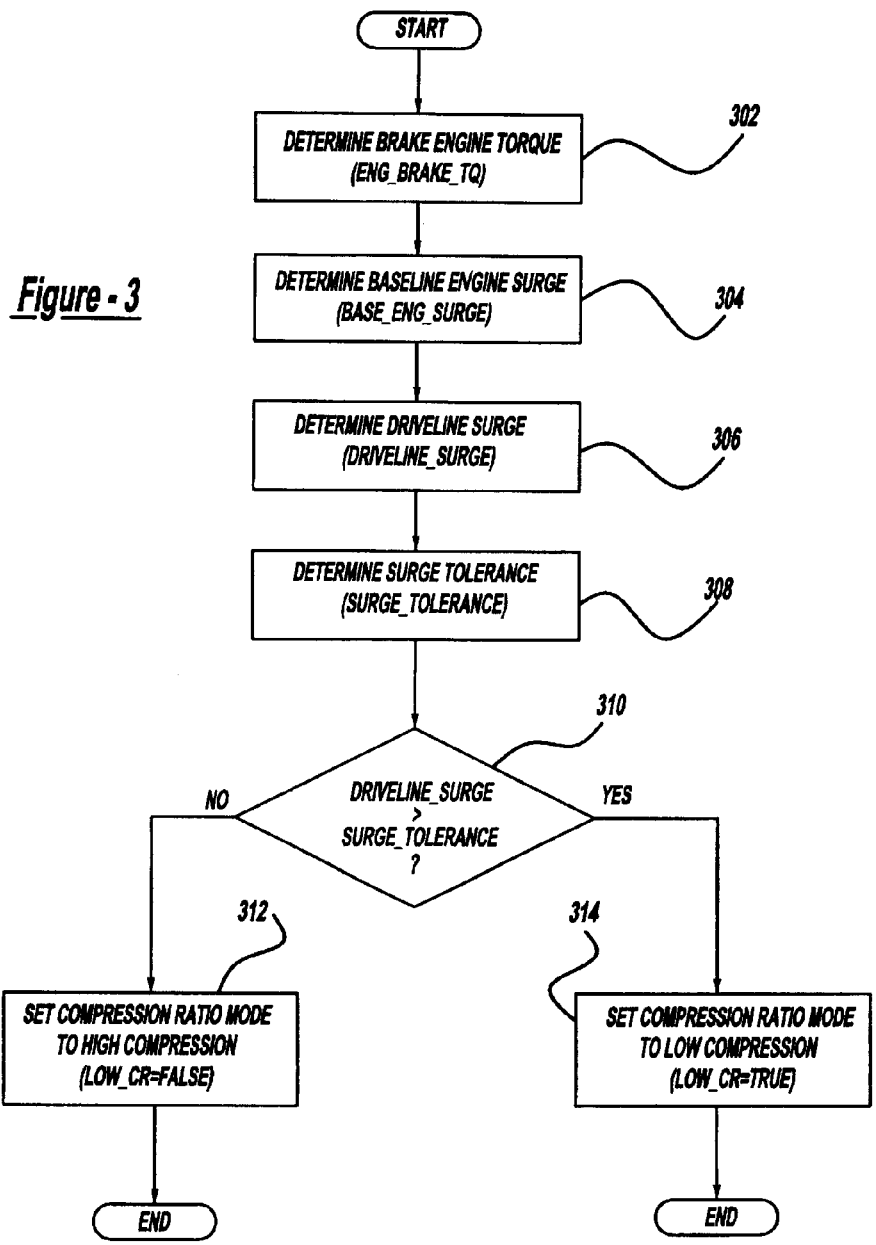
FIG. 3 is a flow diagram of a preferred method for operating a variable compression internal combustion engine in accordance with the present invention.

FIG. 3 shows a flow diagram of a preferred method for operating a variable compression internal combustion engine in a plurality of compression ratio operating modes. In accordance with the present invention, the method includes the steps of determining a brake engine torque, step 302, determining a baseline engine surge based at least in part on the brake engine torque, step 304, determining a driveline surge based at least in part on the baseline engine surge, step 306, determining a driveline surge tolerance based at least in part on an operating condition of the motor vehicle, step 308, and scheduling operation of the engine in one of the compression ratio modes based at least in part of a comparison of the driveline surge to the driveline surge tolerance, steps 310, 312 and 314. The method is now described in detail, by way of example and not limitation, with respect to a variable compression ratio engine have two discrete compression ratio operating modes.

Referring again to FIG. 3, step 302, the brake engine torque can be calculated using any suitable method as known and understood in the art. An example of such a method is described in detail in U.S. Pat. No. 5,241,855, which is owned also by the present assignee and also hereby incorporated by reference in its entirety.

In accordance with U.S. Pat. No. 5,241,855, brake engine torque (BRAKE_TQ) is calculated by subtracting estimated frictional losses attributable to the driveline from an estimate of indicated torque (IND_TQ). Frictional losses (TOTAL_FRIC_TQ) include baseline and miscellaneous frictional losses. Indicated torque is calculated as using look-up tables derived as functions of operating parameters of the engine, including for example engine speed (RPM), air charge (AIRCHG), i.e., mass air flow divided by the number of cylinder fillings per minute), and a measure (SPK_DEL) of spark retard from MBT required to prevent engine knock. For the purposes of the present invention, SPK_DEL is defined as the difference between MBT spark (SPK_MBT) and a so-called "borderline" spark (SPK_BDL), and is at least a function of ECT, ACT and program fuel/engine knock. SPK_BDL represents the spark timing (degree BTDC) at the engine knock limit. A multiplier ITSPKMUL (SPK_DEL) is derived and used as a multiplier for baseline torque at MBT (BASE_ITQ(RPM,AIRCHG)), which is in turn used to estimate IND_TQ. TOTAL_FRIC_TQ is then subtracted from IND_TQ to yield BRAKE_TQ.

Referring to FIG. 3, step 304, BRAKE_TQ is then used to determine a baseline engine surge (BASE_ENG_SURGE) as shown below by Equation (1):

$$\text{BASE\_ENG\_SURGE (Nm)} = C1(\text{SPK\_DEL, RPM}) * \text{BRAKE\_TQ} \qquad \text{Eq. (1)}$$

wherein C1 is a percent multiplier of BRAKE_TQ and represents the magnitude of the surge component at the engine. Exemplary values of C1 as a function of SPK_DEL and RPM are shown below in Table 1:

TABLE 1

Percent Surge Multiplier (C1 (SPK_DEL, RPM))

| SPK_DEL | RPM | | |
|---|---|---|---|
| (deg. BTDC) | 1000 | 2000 | 6000 |
| 0 | 0.03 | 0.02 | 0.01 |
| 10 | 0.05 | 0.03 | 0.02 |
| 20 | 0.15 | 0.10 | 0.05 |
| 30 | 0.30 | 0.20 | 0.10 |

As suggested for example by Table 1, a C1 value of 0.05 (SPK_DEL=10, RPM=1000) and brake torque of 100 Nm would indicate a 5 Nm torque surge level. Although the torque surge level BASE_ENG_SURGE is shown in Newton-meters, the level can be calibrated empirically by driveability testing. RPM captures the frequency of cylinder firing (and therefore surge), and SPK_DEL as described above is at least a function of ECT, ACT and program fuel/engine knock.

Referring now to FIG. 3, step 306, a driveline surge prediction (DRIVELINE_SURGE) is made based at least in part on the estimated baseline engine surge BASE_ENG_SURGE. In accordance with the present invention, the transmissibility of the baseline engine surge to driveline surge is dependent upon a number of factors, including for example a transmission gear ratio (GEAR_RATIO) and a torque converter status (SLIP_RPM). As such, DRIVELINE_SURGE can be expressed as shown below by Equation (2):

$$\text{DRIVELINE\_SURGE(Nm)} = \text{BASE\_ENG\_SURGE} * F1(\text{GEAR\_RATIO}) * F2(\text{SLIP\_RPM}) \qquad \text{Eq. (2)}$$

wherein F1(GEAR_RATIO) is a function representing the transmissibility of engine surge attributable to a transmission gear ratio, and F2(SLIP_RPM) is a function representing the transmissibility of engine surge attributable to a torque converter configured for damping surge. Tables 2 and 3 below provide exemplary values for F1(GEAR_RATIO) and F2(SLIP_RPM), respectively:

TABLE 2

Gear Ratio Transmissibility Function (F1 (GEAR_RATIO))

| GEAR_RATIO | 3.40 | 2.30 | 1.00 | 0.67 |
|---|---|---|---|---|
| F1 (GEAR_RATIO) | 3.00 | 2.30 | 1.00 | 0.70 |

TABLE 3

Torque Converter Transmissibility Function (F2 (SLIP_RPM))

| SLIP_RPM | 0.0 | 50.0 | 150.0 | 300.0 |
|---|---|---|---|---|
| F2 (SLIP_RPM) | 1.0 | 0.9 | 0.7 | 0.5 |

In accordance with Table 2, F1(GEAR_RATIO) values can be a 1-to-1 mappings to reflect torque multiplication by the transmission, e.g., F1(GEAR_RATIO)=2.3 at a gear ratio of 2.3:1, but can be changed as required for calibration flexibility. With reference to Table 3, SLIP_RPM again is defined as the difference between engine speed (RPM) and the torque converter/turbine speed. As such, F2(SLIP_RPM) is equal to 1 where the torque converter is in a "locked" state (zero SLIP_RPM), and less than 1 when the torque converter in an "open" state (higher SLIP_RPM).

Next, the DRIVELINE_SURGE is compared to a driveline surge tolerance (SURGE_TOLERANCE), which is defined for example as a function F3 of vehicle acceleration rate (ACCEL_RATE), steps 308 and 310. Exemplary values of SURGE_TOLERANCE (SURGE_TOLERANCE=F3 (ACCEL_RATE)) are shown below in Table 4:

TABLE 4

| Driveline Surge Tolerance (F3 (ACCEL_RATE)) | | | | |
|---|---|---|---|---|
| ACCEL_RATE (MPH/sec) | 0.0 | 0.5 | 3.0 | 10.0 |
| F3 (ACCEL_RATE) | 3.0 | 5.0 | 10.0 | 30.0 |

SURGE_TOLERANCE as shown in Table 4 reflects the fact that surge is more fully perceived at low vehicle acceleration rates and that more surge can be tolerated at higher vehicle acceleration rates. SURGE_TOLERANCE however can be selected on the basis of other factors, alone or in combination, including for example vehicle weight, road conditions and driver requirements (i.e., preferences, habits, etc.) If the vehicle is heavier, or if the road conditions are harsh, then the threshold of perceivable surge may be greater that that for a lighter vehicle running on smooth road surfaces.

Preferably, the driveline surge tolerance derived in step 308 is offset in accordance with Equation (3) below:

$$SURGE\_TOLERANCE(Nm)=SURGE\_TOLERANCE-HYS \quad Eq. (3)$$

wherein HYS is a calibratable scalar hysteresis value. HYS takes into account that driveline surge is most cases is changing as the vehicle reaches a constant speed or steady-state operating condition. HYS helps to prevent toggling or so-called "hunting" between high and low compression ratio modes when the difference between DRIVELINE_SURGE and the actual surge tolerance (e.g., F3(ACCEL_RATE) value of Table 4) is small.

Referring again to FIG. 3, if the DRIVELINE_SURGE exceeds SURGE_TOLERANCE in accordance with step 310, then the compression ratio operating mode of the internal combustion engine is set to a low compression ratio mode LOW_CR=TRUE). Otherwise, the compression ratio mode is set to a high compression ratio mode (LOW_CR=FALSE). Alternatively, in lieu of steps 310, 312 and 314, if the driveline surge is less than the adjusted surge tolerance, i.e., SURGE_TOLERANCE minus HYS, then the compression ratio is maintained at its current value.

Although operation of the variable compression internal combustion engine has been described with reference to engine operation two discrete compression ratio modes, the method of FIG. 3 can be modified to operate a continuously variable compression ratio ("continuously variable CR") internal combustion engine having an infinite number of discrete compression ratio operating modes.

Figure 4:
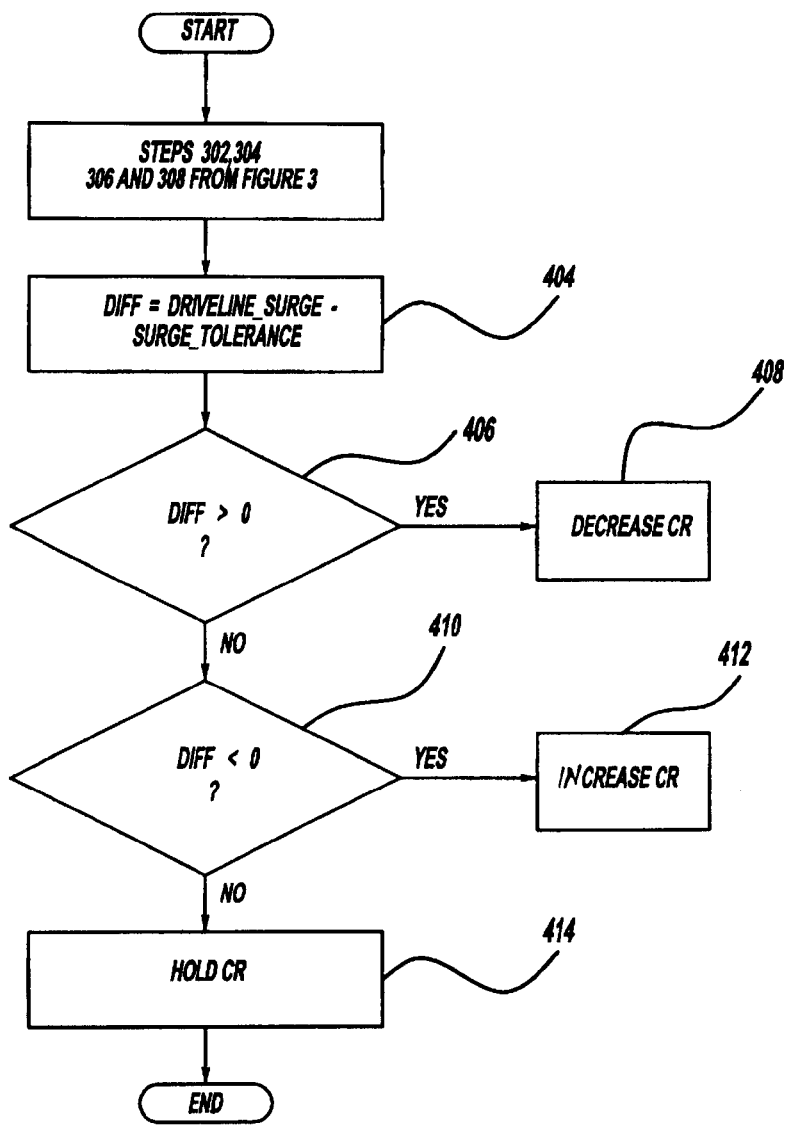
FIG. 4 is a flow diagram of a preferred method for operating a continuously variable compression ratio engine in accordance with the present invention.

FIG. 4 for example shows a preferred method for operating a continuously variable CR internal combustion engine in accordance with the present invention. In lieu of steps 310, 312 and 314 of FIG. 3, steps 404 through 414 are provided for operating a continuously variable CR engine. With reference to step 404, a value (DIFF) is computed by determining the difference between DRIVELINE_SURGE and SURGE_TOLERANCE. The SURGE_TOLERANCE again is preferably offset by a hysteresis value as described above. A PID controller or equivalent device for example can be used to derive the difference value DIFF.

Referring to step 406, if DIFF is greater than a predetermined value (e.g., zero), and assuming the engine is not already operating at its minimum allowable compression ratio, then the appropriate control signals are provided to a variable compression apparatus to decrease the compression ratio of the internal combustion engine, step 408. If DIFF is less than the predetermined value, step 410, and assuming the engine is not already operating at its maximum allowable compression ratio, then the variable compression apparatus is operated to increase the compression ratio of the internal combustion engine, step 412. Otherwise, if DIFF equals the predetermined value, then the current compression ratio is maintained, step 414.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A system for operating an internal combustion engine coupled to a driveline of a motor vehicle, the internal combustion engine being operable in a plurality of compression ratio operating modes, the method comprising:

a variable compression ratio apparatus for varying the compression ratio of the internal combustion engine; and a controller in communication with the variable compression ratio apparatus for determining a driveline surge based at least in part on operating parameters of the motor vehicle, determining a driveline surge tolerance based at least in part on one or more of the vehicle operating parameters, selecting one of the compression ratio operating modes based at least in part on a comparison of the driveline surge to the driveline surge tolerance, and operating the variable compression apparatus to configure the internal combustion engine in the selected one of the compression ratio operating modes.

2. The system in accordance with claim 1, wherein said controller adjusts the driveline surge tolerance with a hysteresis value and selects one of the compression ratio operating modes based at least in part on a comparison of the driveline surge to the adjusted driveline surge tolerance.

3. An article of manufacture for operating an internal combustion engine coupled to a driveline of a motor vehicle, the internal combustion engine being operable in a plurality of compression ratio operating modes via a variable compression ratio apparatus, the article of manufacture comprising:

a computer usable medium; and a computer readable program code embodied in the computer usable medium for directing a computer to control the steps of determining a driveline surge based at least in part on operating parameters of the motor vehicle, determining a driveline surge tolerance based at least in part on one or more of the vehicle operating parameters, selecting one of the compression ratio operating modes based at least in part on a comparison of the driveline surge to the driveline surge tolerance, and operating the variable compression apparatus to configure the internal combustion engine in the selected one of the compression ratio operating modes.

4. The article of manufacture in accordance with claim 3, wherein said computer readable program code further directs the computer to control the steps of adjusting the driveline surge tolerance with a hysteresis value, and selecting one of the compression ratio operating modes based at least in part on a comparison of the driveline surge to the adjusted driveline surge tolerance.

5. A method of operating an internal combustion engine coupled to a driveline of a motor vehicle, the internal combustion engine being operable in a plurality of compression ratio operating modes, the method comprising:
   determining a driveline surge based at least in part on operating parameters of the motor vehicle;
   determining a driveline surge tolerance based at least in part on one or more of the vehicle operating parameters; and
   selecting one of the compression ratio operating modes based at least in part on a comparison of the driveline surge to the driveline surge tolerance.

6. The method according to claim 5, wherein said step of determining the driveline surge comprises the steps of:
   determining a brake engine torque;
   determining a baseline engine surge based at least in part on the brake engine torque; and
   determining the driveline surge based at least in part on the baseline engine surge.

7. The method according to claim 6, wherein said baseline engine surge is proportional to the brake engine torque.

8. The method according to claim 6, wherein said step of determining the baseline engine surge comprises the steps of:
   determining a maximum brake torque (MBT) spark timing for the internal combustion engine;
   determining a borderline spark timing for the internal combustion engine;
   computing a difference between the MBT spark timing and the borderline spark timing; and
   defining a percent multiplier of the brake engine torque as a function of the difference between the MBT spark timing and the borderline spark timing; and
   using the percent multiplier and the brake engine torque to derive the baseline engine surge.

9. The method according to claim 6, wherein said driveline surge is proportional to the baseline engine surge.

10. The method according to claim 6, wherein said step of determining the driveline surge comprises the steps of:
    defining a percent multiplier of the baseline engine surge that represent transmissibility of the baseline engine surge; and
    using the percent multiplier and the baseline engine surge to derive the driveline surge.

11. The method according to claim 10, wherein the percent multiplier is a first multiplier representing a portion of the transmissibility attributable to a transmission gear ratio.

12. The method according to claim 10, wherein the percent multiplier is a second multiplier representing a portion of the transmissibility attributable to a torque converter status of the motor vehicle.

13. The method according to claim 5, wherein the driveline surge tolerance is at least in part a function of vehicle acceleration rate.

14. The method according to claim 5, wherein said selecting step comprises the step of selecting a low compression ratio operating mode for the internal combustion engine if the driveline surge exceeds the driveline surge tolerance.

15. The method according to claim 5, wherein said selecting step comprises the step of selecting a high compression ratio operating mode for the internal combustion engine if the driveline surge is less than or equal to the driveline surge tolerance.

16. The method according to claim 5, further comprising the steps of:
    determining a difference value between the driveline surge and the driveline surge tolerance;
    selecting a lower compression ratio operating mode if the difference is greater than a predetermined value,
    selecting a higher compression ratio operating mode if the difference is less than the predetermined value; and
    maintaining a current compression ratio operating mode if the difference is equal to the predetermined value.

17. The method according to claim 5, further comprising the step of:
    adjusting the driveline surge tolerance with a hysteresis value; and
    selecting one of the compression ratio operating modes based at least in part on a comparison of the driveline surge to the adjusted driveline surge tolerance.

18. The method according to claim 17, further comprising the step of selecting a low compression ratio operating mode for the internal combustion engine if the driveline surge exceeds the adjusted driveline surge tolerance.

19. The method according to claim 17, further comprising the step of selecting a high compression ratio operating mode for the internal combustion engine if the driveline surge is less than or equal to the adjusted driveline surge tolerance.

20. The method according to claim 17, further comprising the steps of:
    determining a difference value between the driveline surge and the adjusted driveline surge tolerance;
    selecting a lower compression ratio operating mode if the difference is greater than a predetermined value,
    selecting a higher compression ratio operating mode if the difference is less than the predetermined value; and
    maintaining a current compression ratio operating mode if the difference is equal to the predetermined value.

21. A method of operating a variable compression ratio internal combustion engine coupled to a driveline of a motor vehicle, the internal combustion engine being operable in at least a high compression ratio mode and a low compression ratio mode, the method comprising:
    determining a brake engine torque;
    determining a baseline engine surge based at least in part on the brake engine torque;
    determining a driveline surge based at least in part on the baseline engine surge;
    determining a driveline surge tolerance based at least in part on one or more operating parameters of the motor vehicle; and
    scheduling operation of the internal combustion engine in one of the compression ratio operating modes based at least in part of a comparison of the driveline surge to the driveline surge tolerance.

22. The method according to claim 21, wherein said baseline engine surge is proportional to the brake engine torque.

23. The method according to claim 21, wherein said step of determining the baseline engine surge comprises the steps of:

determining a maximum brake torque (MBT) spark timing for the internal combustion engine;

determining a borderline spark timing for the internal combustion engine;

computing a difference between the MBT spark timing and the borderline spark timing; and defining a percent multiplier of the brake engine torque as a function of the difference between the MBT spark timing and the borderline spark timing; and using the percent multiplier and the brake engine torque to derive the baseline engine surge.

24. The method according to claim 21, wherein said driveline surge is proportional to the baseline engine surge.

25. The method according to claim 21, wherein said step of determining the driveline surge comprises the steps of:

defining a percent multiplier of the baseline engine surge that represents transmissibility of the baseline engine surge; and using the percent multiplier and the baseline engine surge to derive the driveline surge.

26. The method according to claim 25, wherein the percent multiplier is a first multiplier representing a portion of the transmissibility attributable to a transmission gear ratio.

27. The method according to claim 25, wherein the percent multiplier is a second multiplier representing a portion of the transmissibility attributable to a torque converter status of the motor vehicle.

28. The method according to claim 25, wherein the driveline surge tolerance is a function of vehicle acceleration rate.

29. The method according to claim 21, wherein said scheduling step comprises the step of selecting a low compression ratio operating mode for the internal combustion engine if the driveline surge exceeds the driveline surge tolerance.

30. The method according to claim 21, wherein said scheduling step comprises the step of selecting a high compression ratio operating mode for the internal combustion engine if the driveline surge is less than or equal to the driveline surge tolerance.

31. The method according to claim 21, further comprising the steps of:

determining a difference value between the driveline surge and the driveline surge tolerance;

selecting a lower compression ratio operating mode if the difference is greater than a predetermined value, selecting a higher compression ratio operating mode if the difference is less than the predetermined value; and maintaining a current compression ratio operating mode if the difference is equal to the predetermined value.

32. The method according to claim 21, further comprising the step of:

adjusting the driveline surge tolerance with a hysteresis value; and selecting one of the compression ratio operating modes based at least in part on a comparison of the driveline surge to the adjusted driveline surge tolerance.

33. The method according to claim 32, further comprising the step of selecting a low compression ratio operating mode for the internal combustion engine if the driveline surge exceeds the adjusted driveline surge tolerance.

34. The method according to claim 32, further comprising the step of selecting a high compression ratio operating mode for the internal combustion engine if the driveline surge is less than or equal to the adjusted driveline surge tolerance.

35. The method according to claim 32, further comprising the steps of:

determining a difference value between the driveline surge and the adjusted driveline surge tolerance;

selecting a lower compression ratio operating mode if the difference is greater than a predetermined value, selecting a higher compression ratio operating mode if the difference is less than the predetermined value; and maintaining a current compression ratio operating mode if the difference is equal to the predetermined value.

* * * * *